United States Patent
Riddell (10) Patent No.: US 11,163,731 B1
(45) Date of Patent: Nov. 2, 2021

(54) AUTOBUILD LOG ANOMALY DETECTION METHODS AND SYSTEMS

(71) Applicant: salesforce.com, Inc., San Francisco, CA (US)

(72) Inventor: Kevin Riddell, Edmonton (CA)

(73) Assignee: salesforce.com, Inc.

( * ) Notice: Subject to any disclaimer, the term of this patent is extended or adjusted under 35 U.S.C. 154(b) by 0 days.

(21) Appl. No.: 15/929,476

(22) Filed: May 4, 2020

(51) Int. Cl.
| | |
|---|---|
| *G06F 11/36* | (2006.01) |
| *G06F 16/18* | (2019.01) |
| *G06F 16/182* | (2019.01) |
| *G06F 7/544* | (2006.01) |
| *G06F 16/17* | (2019.01) |

(52) U.S. Cl.
CPC ........ *G06F 16/1873* (2019.01); *G06F 7/5443* (2013.01); *G06F 11/368* (2013.01); *G06F 11/3692* (2013.01); *G06F 16/1734* (2019.01); *G06F 16/1824* (2019.01)

(58) Field of Classification Search
CPC ............. G06F 16/1873; G06F 16/1824; G06F 16/1734; G06F 11/3692; G06F 11/368; G06F 7/5443
USPC .......................................................... 707/695
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

Li, Weixi: "Automatic Log Analysis using Machine Learning Awesome Automatic Log Analysis version 2.0", Uppsala Univsersitet, Nov. 2013. (Year: 2013).*

(Continued)

*Primary Examiner* — Kuen S Lu
(74) *Attorney, Agent, or Firm* — LKGlobal | Lorenz & Kopf, LLP (57) ABSTRACT

Computing systems, database systems, and related methods are provided for detecting anomalies within a log file. One method involves obtaining log data for test runs executed with respect to a compiled version of executable code for an application platform, filtering the log data based on one or more performance metrics to obtain reference log data, converting the reference log data to a corresponding numerical representation and generating a matrix of the numerical representation. For each line of test log data associated with an update to the executable code, the method converts the line into a numerical representation, determines a difference between the numerical representation and the matrix, and provides an indication of an anomaly when the difference is greater than a detection threshold.

20 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0210477 A1* | 9/2005 | Auerbach ............ G06Q 30/02 719/315 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0328315 A1* | 11/2016 | Rajamanickam ... G06F 11/3684 |
| 2017/0075790 A1* | 3/2017 | Macleod ............. G06F 11/3668 |
| 2017/0290024 A1* | 10/2017 | Ouyang ................ H04W 24/08 |

OTHER PUBLICATIONS

Python Software Foundation, logreduce 0.5.2, pip install, Webpage, https://pypi.org/project/logreduce/, Dec. 17, 2019.

\* cited by examiner

```
402              404
 ↓                ↓
0.0    | 1: This is just status quo
0.0    | 2: This is just status quo
0.0    | 3: This is just status quo
0.0    | 4: This is just status quo
0.75   | 5: This is a needle in a haystack
0.0    | 6: This is just status quo
0.0    | 7: This is just status quo
0.0    | 8: This is just status quo
0.0    | 9: This is just status quo
```

AUTOBUILD LOG ANOMALY DETECTION METHODS AND SYSTEMS

TECHNICAL FIELD

Embodiments of the subject matter described herein relate generally to database systems, and more particularly, to methods and systems that support detecting anomalies within a test log generated from tests run against executable code for an on-demand application platform.

BACKGROUND

Modern software development often employs testing in order to eliminate as many errors or "bugs" as possible before the software is released for widespread use. Automated software testing techniques are often utilized to verify that a program performs consistent with its specified or intended behavior. Unit testing is one method of automated testing that targets individual functions, procedures, or other portions of source code, for example, by isolating parts of a software program to show that the individual constituent parts are correct. To this end, test cases are often created that specify the inputs, execution conditions, testing procedure, testing results, and/or the like that in combination define the respective tests to be performed on a given software program. Test cases are typically written for all functions and methods so that whenever a change causes a fault, it can be quickly identified and fixed, thereby ensuring that code meets its design and behaves as intended early in the development cycle.

In practice, as code increases in length and complexity and the number of test cases increase accordingly, it becomes increasingly difficult to identify problems and root causes when aspects of the code are changed. For example, during development, one or more members of a development team may make changes to the source code for a piece of software, which may result in one or more failed tests when a batch of tests are run against the modified source code. However, manually analyzing the voluminous amount of information contained in a log of the test results for debugging purposes can be time consuming and prone to user error or lapses. Accordingly, it is desirable to reduce the amount of time and effort required for developers to analyze test results and identify and resolve errors within source code.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to computing systems and methods for detecting testing anomalies with respect to changes or updates to computer-executable code. For purposes of explanation, the subject matter may be described herein primarily in the context of detecting anomalies with respect to a compiled version of executable code for an application platform capable of concurrently providing instances of a virtual application to one or more different end users, such as, for example, an automatically compiled branch of source code for the application platform. In this regard, when a software developer makes a change with respect to the source code for a particular version of the application platform, an autobuild system supporting a continuous integration/continuous deployment (CI/CD) pipeline may automatically compile the updated source code into an executable version of the updated source code for the application platform. The autobuild system compiling the updated source code may trigger a testing system executing a plurality of tests against the complied executable code for the application platform to generate a log file including data associated with the performance of the code with respect to the respective tests.

As described in greater detail below, each line of the test log data contained in the log file is analyzed with respect to a vector space model associated with the respective version of the application platform to identify anomalies when a difference between the respective line of test log data and the vector space model is greater than a detection threshold. In this regard, the vector space model associated with the respective version of the application platform represents the non-anomalous or reference test performance of the tests with respect to that version of the application platform source code. For example, prior runs of the tests with respect to previous compilations of the respective version of the application platform source code that achieved satisfactory test performance or test performance metrics greater than some threshold may represent the reference test log result space for that application platform source code version. The test log data associated with those respective prior test runs may be utilized to generate a matrix that provides a multi-dimensional numerical representation of the non-anomalous test log result space for the application platform source code version.

After obtaining a matrix that represents a reference, non-anomalous multidimensional vector space for the test results for the application platform source code version, each line of the test log data associated with the test run against the updated compilation of that application platform source code version is compared to the non-anomalous vector space to identify anomalous deviations from the vector space model. Each line of the test log data associated with the test run against the updated compilation of application platform source code is converted to a numerical representation in a corresponding manner as was used to generate the matrix, and then a deviation metric for the respective line may be calculated based on the difference between the respective numerical representation of the respective line of test log data and the vector space matrix, for example, by computing a dot product between the log line and the vector space matrix. In this regard, when the magnitude of the dot product is greater than a detection threshold, the line of test log data may be marked or otherwise flagged as anomalous. In this manner, the lines of the test log data may be analyzed with respect to the reference vector space matrix to identify a subset of anomalous lines within the test log data. Indicia of the anomalous lines may be output or otherwise provided to a user or other entity to facilitate debugging with respect to the changes or updates to the application platform source code. By identifying the anomalies or deviations relative to the aggregate multidimensional non-anomalous test result vector space, anomalous log lines may be identified even in scenarios where there may be one or more individually similar lines within the non-anomalous test result vector space but a relatively large deviation between those log lines and the test result vector space, thereby identifying potential anomalies or issues that could otherwise go unrecognized by manual reviewers or other automated approaches (e.g., nearest neighbor algorithms).

Figure 1:
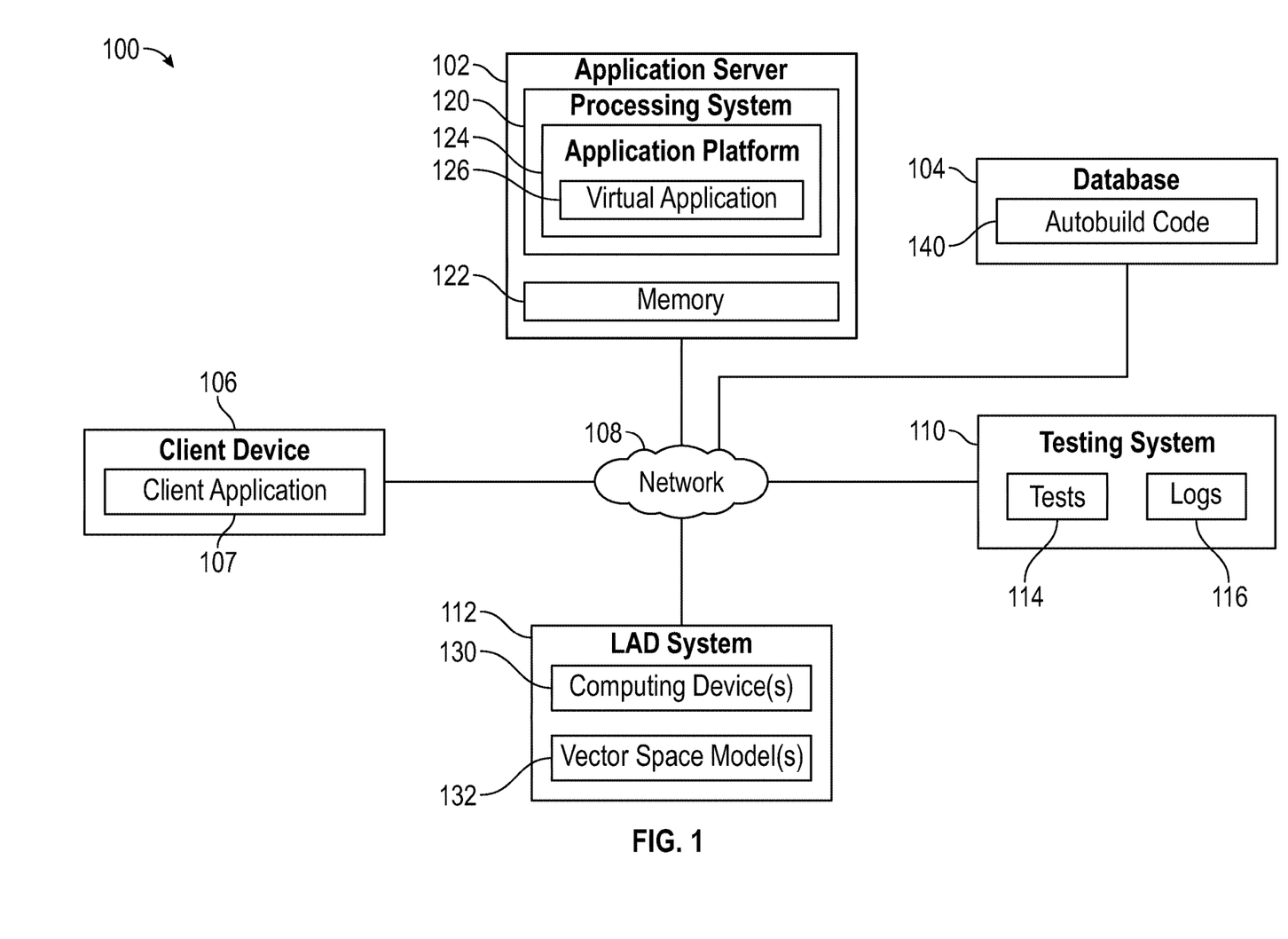
FIG. 1 is a block diagram of an exemplary computing system.

FIG. 1 depicts an exemplary embodiment of a computing system 100 for detecting and providing corresponding indicia of anomalies within log data associated with changes or updates to executable code, such as a compiled version of executable source code for an application platform 124 provided by a server 102. In the illustrated embodiment, a server 102 is communicatively coupled to a database 104 and one or more instances of client devices 106 via a communications network 108. The communications network 108 may be realized as any sort or combination of wired and/or wireless computer network, a cellular network, a mobile broadband network, a radio network, the Internet, or the like. A testing system 110 is communicatively coupled to the communications network 108 to support automated testing of the compiled executable code and generation of corresponding log files that maintain the performance data and other results associated with a respective test run, as described in greater detail below. A log anomaly detection (LAD) system 112 is communicatively coupled to the communications network 108 and configured to analyze log files generated by the testing system 110 to detect and provide corresponding indicia of anomalous lines of a respective log file.

It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106. Additionally, practical implementations may include multiple instances of the server 102 and/or the database 104, which, in turn may reside behind or rely on one or more load balancers to manage resource utilization, as will be appreciated in the art. Furthermore, although the database 104 is depicted separate from the application server 102, in practice, the database 104 may be integrated or otherwise combined with the application server 102 as part of an integrated database system. Alternatively, the database 104 may be integrated or otherwise combined with the testing system 110 and/or the LAD system 112. Moreover, in some embodiments, the features and/or functionality described herein in the context of one or more of the systems 110, 112 may be implemented or otherwise performed by or at the server 102 and/or the database 104, and in which case a respective system 110, 112 may not exist on separate or distinct hardware within the computing system 100.

The server 102 generally represents a computing device, computing system or another combination of processing logic, circuitry, hardware, and/or other components configured to support the processes, tasks, operations, and/or functions described herein. In this regard, the server 102 generally includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random-access memory (RAM), read only memory (ROM), flash memory, magnetic or optical mass storage, or any other suitable non-transitory short or long-term data storage or other computer-readable media, and/or any suitable combination thereof. In one or more embodiments, the programming instructions cause the processing system 120 to create, generate, or otherwise facilitate an application platform 124 that supports or otherwise facilitates the processes, tasks, operations, and/or functions described herein. In some embodiments, the application platform 124 may also generate or otherwise provide instances of a virtual application at run-time (or "on-demand") based at least in part upon code and other data that is stored or otherwise maintained by a database (e.g., database 104), such that the server 102 functions as an application server 102.

Similarly, the testing system 110 generally includes a server or other computing device, computing system or another combination of processing logic, circuitry, hardware, and/or other components configured to support the processes, tasks, operations, and/or functions described herein. In exemplary embodiments, the testing system 110 includes processing system that includes or accesses a data storage element storing executable instructions or code that cause the processing system to create, generate, or otherwise facilitate a testing application that supports executing a plurality of test cases 114, alternatively referred to herein as a test run, with respect to compiled code executed by the processing system 120 at the application server 102 to provide the application platform 124. The testing application stores or otherwise maintains the results of the test run in a log file 132 maintained in a data storage element associated with the testing system 110. In one or more embodiments, the testing application is realized as an application programming interface (API), software agent, or the like that is capable of interacting with another element in the computing system 100, such as the client device 106, the application server 102, the testing system 110 and/or the database 104, as described in greater detail below.

In exemplary embodiments, the LAD system 112 includes one or more computing devices 130, which may be realized as one or more server computing systems or other suitable processing systems or combinations of processing logic, circuitry, hardware, and/or other components configured to support the processes, tasks, operations, and/or functions described herein. The LAD system 112 also includes a data storage element or memory configured to store or otherwise maintain vector space models 132 generated by the LAD system 112 and utilized to detect anomalous log lines for a particular code version, as described in greater detail below.

The data storage element or memory associated with the LAD system 112 may also maintain executable instructions or code that cause a computing device 130 of the LAD system 112 to create, generate, or otherwise facilitate an analysis application that supports analyzing a log file associated with a test run with respect to the appropriate vector space model 132 and provide corresponding indicia of anomalous log lines to another element of the computing system 100, such as the client device 106, the application server 102, the testing system 110 and/or the database 104, as described in greater detail below. In one or more embodiments, the analysis application is realized as an application programming interface (API), software agent, or the like that is capable of interacting with another element of the computing system 100.

The client device 106 generally represents an electronic device coupled to the network 108 that may be utilized by a user to write or develop source code, update or otherwise make changes to existing source code, execute test cases on source code, review and/or analyze test results and corresponding log files to identify anomalies within log files, as described in greater detail below. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that supports communication with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like. One or more client applications 107 at the client device 106 may variously be utilized to communicate with the testing system 110, the LAD system 112, and/or the database 104.

In exemplary embodiments, the database 104 stores or otherwise maintains one or more versions of source code that are executable by the processing system 120 at the server 102 to generate, facilitate, or otherwise provide the application platform 124 and generate one or more instances of a virtual application 126. For example, the database 104 may store compiled versions of source code corresponding to different versions of the application platform 124. In this regard, an autobuild system or other continuous integration/continuous deployment (CI/CD) pipeline may support and maintain compiled versions of source code for different versions of the application platform 124, such as, for example, a lower level version of the application platform 124 utilized by developers to make changes, modifications, or additions to the functionality of the application platform 124, one or more intermediate versions of the application platform 124 that may be utilized by developers and potentially some subset of end users or customers for debugging or performance analysis (e.g., beta testing), and a higher level version of the application platform 124 (e.g., a production version) that may be accessible to a broader set of end users, customers, or the like. In one embodiment, the autobuild system is configured to automatically compile the source code for the respective versions of the application platform 124 on a continual and periodic basis (e.g., hourly, daily, weekly, or the like) and store the most recently compiled version of the source code for the respective application platform version in the database 104. For purposes of explanation, a compiled version of application platform version source code generated by an autobuild system is referred to herein as autobuild code 140. In some embodiments, the database 104 may also store or otherwise maintain other data for integration with or invocation by a virtual application 126 in objects organized in object tables.

Figure 2:
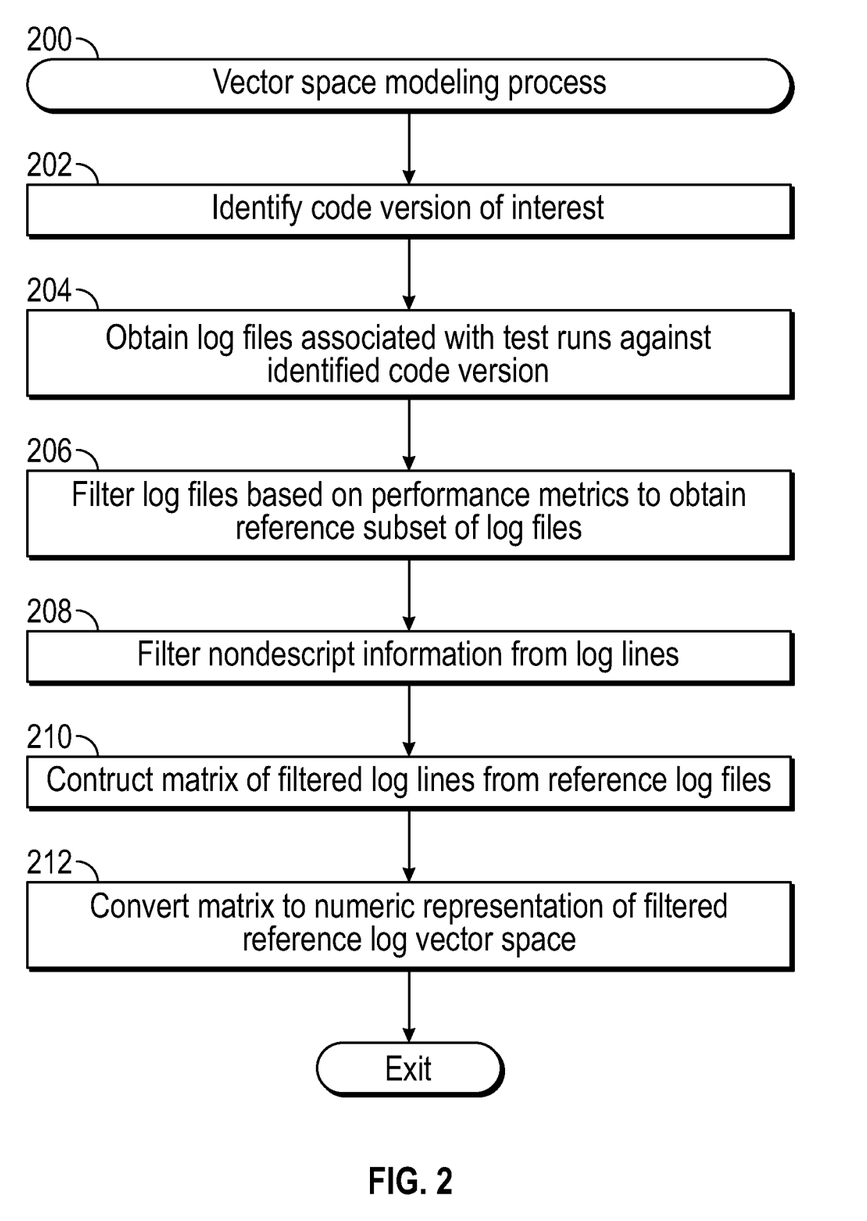
FIG. 2 is a flow diagram of an exemplary vector space modeling process suitable for implementation in the computing system of FIG. 1 in accordance with one or more embodiments.

FIG. 2 depicts an exemplary embodiment of a vector space modeling process 200 suitable for implementation in the computing system 100 to dynamically and automatically generate vector space models based on reference test result log files that may be utilized to identify anomalies within subsequent test result log files, as described in greater detail below in the context of FIG. 3. For illustrative purposes, the following description may refer to elements mentioned above in connection with FIG. 1. In this regard, while portions of the vector space modeling process 200 may be performed by different elements of the computing system 100, for purposes of explanation, the subject matter is described herein in the context of the vector space modeling process 200 being primarily performed by the LAD system 112 and/or computing device(s) 130. It should be appreciated that the vector space modeling process 200 may include any number of additional or alternative tasks, the tasks need not be performed in the illustrated order and/or the tasks may be performed concurrently, and/or the vector space modeling process 200 may be incorporated into a more comprehensive procedure or process having additional functionality not described in detail herein. Moreover, one or more of the tasks shown and described in the context of FIG. 2 could be omitted from a practical embodiment of the vector space modeling process 200 as long as the intended overall functionality remains intact.

The illustrated vector space modeling process 200 begins by identifying or otherwise determining a code version for which to develop a vector space model and retrieving or otherwise obtaining log files for test runs associated with that identified code version (tasks 202, 204). For example, the LAD system 112 may perform the vector space modeling process 200 on a periodic basis (e.g., daily, weekly, monthly, and/or the like) to develop a different vector space model 132 for each version of autobuild code 140. In this regard, the autobuild system may automatically compile the different versions of source code for the application platform 124 into different instances of autobuild code 140 corresponding to the respective application platform version, and then initiate testing of the respective versions of autobuild code 140 by the testing system 110. For example, upon compiling source code for a version of the application platform 124, the autobuild system may utilize an API or similar feature to trigger the testing system 110 running a set of test cases 114 against the autobuild code 140. To test the autobuild code 140, the autobuild code 140 is loaded or otherwise executed by the processing system 120 at an application server 102 to generate the corresponding version of the application platform 124, which is then accessible to the testing system 110 via the network 108. In this manner, upon the source code being compiled, the newly built version(s) will go be tested against a set of predefined tests which are most applicable to the respective version(s). In practice, the application server 102 may be part of the autobuild system, or the autobuild system may include a duplicative or redundant instance of the server 102 that tests may be run against.

In exemplary embodiments, the testing system 110 automatically runs one or more automated test cases, such as graphical user interface (GUI) tests, functional tests, unit tests, and/or the like, against the version of the application platform 124 (or with respect to an instance of the virtual application 126 generated by the respective version of the application platform 124) and creates a corresponding log data file 116 associated with the test run. For each test 114 that makes up the test run, the associated test result log data file 116 includes a line, row, or similar delineated entry associated with that respective test that includes various information characterizing or describing the execution of the test 114. For example, the log line may include, without limitation, descriptive information or data identifying the test 114 (e.g., one or more unique identifiers assigned to the test case), performance metrics or data associated with execution of the test 114 (e.g., the duration of time required to complete the test case, whether the result of the test corresponds to passing or failing the test case, etc.), contextual metadata characterizing the operating context for the test (e.g., the date and time of execution of the test, information identifying the particular server 102 the test was performed on or with respect to, and/or the like), and potentially other test result or debugging data, such as, HTTP callouts, errors, exceptions or other events generated during the test, automated processes or workflows invoked or involved in the test, database changes during the test, and/or the like. The resulting test result log data file 116 then includes a plurality of lines of data (alternatively referred to herein as log lines) corresponding to each individual test 114 that made up the respective test run, with the log data file 116 being stored or otherwise maintained in association with the particular autobuild code version (e.g., by associating each test result log data file 116 with an identifier or other indicia of the corresponding version of autobuild code 140). The LAD system 112 may thereby retrieve or otherwise obtain, from the testing system 110 via the network 108, a set of log data files 116 associated with a particular version of autobuild code 140 to be modeled. For example, the LAD system 112 may obtain a subset of recent log data files 116 (e.g., the ten most recent log data files) associated with the autobuild code 140 of interest for further analysis.

Still referring to FIG. 2, the vector space modeling process 200 continues by filtering or otherwise excluding one or more log files from the obtained log files for the code version of interest to obtain a subset of reference log files for model development (task 206). In this regard, in exemplary embodiments, the LAD system 112 analyzes the performance data or metrics associated with the different obtained log files 116 to identify the subset of the log files that reflect the best performance across the test run or are otherwise likely to exhibit the fewest anomalies, that is, the log files having associated performance metrics that satisfy corresponding selection thresholds. In other words, the filtered subset of log files represents normal or good test results for the autobuild code version that may be utilized as a reference for identifying anomalous test results. For example, from within the ten most recent log files 116 obtained for a given autobuild code version, the LAD system 112 may preferentially select a subset of the five log files 116 that had the lowest associated execution time for completing the entire test run of test cases 114, the highest aggregate rate of passing test cases 114 across the entire test run of test cases 114, the fewest number or rate of errors or exceptions across the entire test run of test cases 114, and/or the like. In some embodiments, the LAD system 112 may perform a multivariate analysis to identify or optimize the retained subset of log files 116 across different performance metrics or parameters.

After identifying a reference subset of log files, the vector space modeling process 200 filters or otherwise removes nondescript text or other nondescript information from the log lines within the reference log files (task 208). In this regard, the LAD system 112 goes through each log line of each reference log file to remove various words or other alphanumeric characters or markup within each log line that does not pertain to the performance or execution of the respective test case. For example, the LAD system 112 may remove commonly used words (e.g., grammatical articles, prepositions, pronouns, and/or the like) dates, timestamps, or other metadata characterizing aspects of the test run or test environment that are ancillary, tangential, or otherwise not relevant to or probative of the performance of the underlying code being tested, such as universally unique identifiers (UUIDs) or the like. Thus, the result of the LAD system 112 filtering nondescript information from a reference log file results in a filtered reference log file with modified log lines that retain and include only descriptive text or information that remain after filtering.

After removing nondescript information from the reference log files, the vector space modeling process 200 continues by generating or otherwise constructing a matrix from the modified log lines of the filtered reference log files (task 210). In this regard, the LAD system 112 may construct a multidimensional matrix out of individual vectors, where each vector corresponds to a respective log line of a respective reference log file, and the entries of the vector correspond to the remaining pieces of data or information retained within the respective modified log line of the respective reference log file. Thus, each entry of the resulting matrix corresponds to a discrete segment of alphanumeric text or characters that remains within a modified log line of a respective modified log line. It should be noted that the subject matter described herein is not limited to any particular arrangement or number of dimensions for the vector space matrix.

Still referring to FIG. 2, after constructing the matrix of remaining test log data within the filtered reference log files, the vector space modeling process 200 hashes or otherwise converts each entry within the matrix to a corresponding numerical value, resulting in a numerical representation of the vector space defined by the filtered reference log files (task 212). In this regard, each combination of alphanumeric characters may be assigned a unique numeric value, such that different words have different assigned numeric values but each instance of a given word within the matrix that appears within different log lines or log files is assigned the same value. For example, the LAD system 112 may use a hashing vectorizer, term frequency-inverse document frequency (TD-IDF), or another suitable technique or algorithm to assign numerical values to different segments of alphanumeric characters based on the estimated relevance or prevalence of the respective character segment.

The resulting numerical matrix representation of the filtered reference log file vector space is stored or otherwise maintained at the LAD system 112 as the vector space model 132 associated with the particular version of autobuild code 140. For example, if the LAD system 112 identifies the lower level mainline code branch of the application platform 124 as the version of autobuild code 140 of interest, the LAD system 112 (e.g., one of the computing devices 130) may retrieve, from the testing system 110, the log files 116 corresponding to the ten most recent test runs against the mainline autobuild code 140 (e.g., tasks 202, 204). The LAD system 112 and/or computing device 130 analyzes the test result log data maintained in the obtained log files 116 to identify and select the subset of log files 116 that achieve a desired performance (e.g., a pass/fail rate above a threshold value, a cumulative execution time below a threshold, a number of errors or exceptions below a threshold, etc.) (e.g., task 206). The LAD system 112 and/or computing device 130 then filters nondescript information from the log lines of reference subset of mainline autobuild log files and generates a corresponding numerical representation of the resulting modified log lines of the reference mainline autobuild log files (e.g., tasks 208, 210, 212). The resulting numerical matrix is then stored or otherwise maintained at the LAD system 112 as the mainline autobuild code vector space model 132.

In practice, the vector space modeling process 200 may be periodically performed with respect to each potential code version of interest to dynamically update the vector space models 132 as the code versions and/or test cases change over time. For example, the testing system 110 may automatically initiate the LAD system 112 performing the vector space modeling process 200 with respect to a particular code version each time a particular version of autobuild code 140 is updated and retested by the testing system 110. That said, in other embodiments, the vector space modeling process 200 may be triggered or otherwise initiated automatically by the LAD system 112 based on one or more performance metrics associated with a respective vector space model 132. For example, if the mainline autobuild code vector space model 132 results in detection of a number, percentage or rate of anomalies that is greater than a model updating threshold when applied to a subsequent log file as described in greater detail below in the context of FIG. 3, the LAD system 112 may automatically initiate the vector space modeling process 200 to dynamically update the mainline autobuild code vector space model 132 to improve performance.

Figure 3:
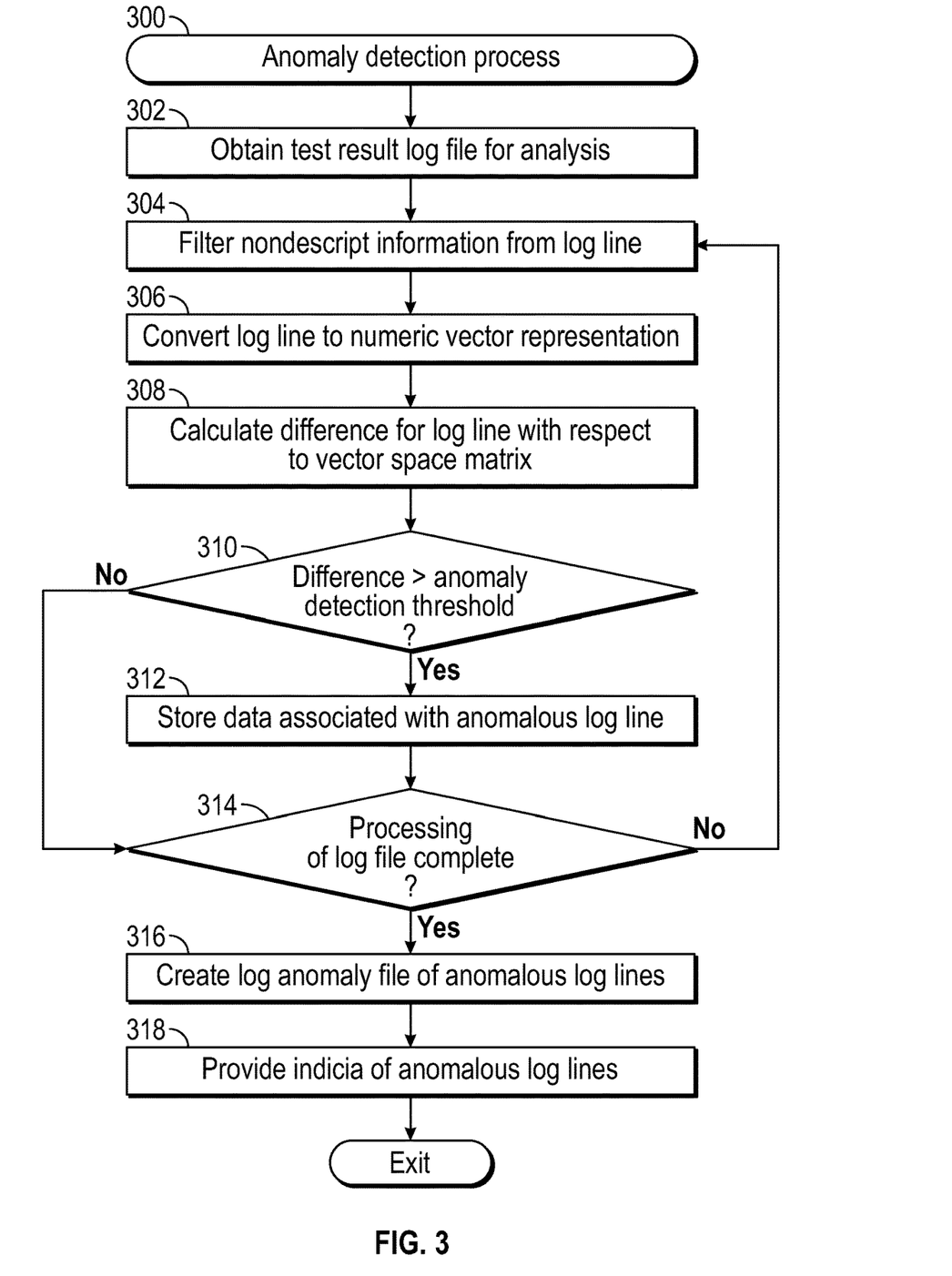
FIG. 3 is a flow diagram of an exemplary anomaly detection process suitable for implementation in the computing system of FIG. 1 in connection with the vector space modeling process of FIG. 2 in accordance with one or more embodiments.

FIG. 3 depicts an exemplary embodiment of an anomaly detection process 300 suitable for implementation in the computing system 100 to detect anomalous log lines using a vector space model resulting from the vector space modeling process 200 of FIG. 2. For illustrative purposes, the following description may refer to elements mentioned above in connection with FIG. 1. In this regard, while portions of the anomaly detection process 300 may be performed by different elements of the computing system 100, for purposes of explanation, the subject matter is described herein in the context of the anomaly detection process 300 being primarily performed by the LAD system 112 and/or computing device(s) 130. It should be appreciated that the anomaly detection process 300 may include any number of additional or alternative tasks, the tasks need not be performed in the illustrated order and/or the tasks may be performed concurrently, and/or the anomaly detection process 300 may be incorporated into a more comprehensive procedure or process having additional functionality not described in detail herein. Moreover, one or more of the tasks shown and described in the context of FIG. 3 could be omitted from a practical embodiment of the anomaly detection process 300 as long as the intended overall functionality remains intact.

Referring to FIG. 3, with continued reference to FIGS. 1-2, in exemplary embodiments, the anomaly detection process 300 is performed after additions, deletions, or other updates or changes are made to the source code for a particular version of the application platform 124. For example, a developer looking to add a new feature or functionality may modify the source code for the lower level mainline code branch of the application platform 124 to incorporate the functionality. In this regard, the client application 107 at the client device 106 may be configured to provide a source code editor that allows a developer or other user of the client device 106 to make changes to the source code via the network 108. After updating the source code, the developer may initiate compiling of the modified source code (or the compiling may be initiated automatically by the application platform 124), for example, by the autobuild system, resulting in modified autobuild code for the mainline code branch version of the application platform 124. Thereafter, the developer may initiate the testing system 110 (e.g., via an API call by the client application 107) performing a test run of test cases against the modified autobuild code (or the testing may be initiated automatically by the autobuild system via an API call) to generate a test result log file 116 that reflects the updates to the source code for the mainline code branch version of the application platform 124. Subsequently, the developer may initiate the LAD system 112 performing the anomaly detection process 300 (or the testing system may automatically initiate the LAD system 112 performing the anomaly detection process 300 in response to a poorly performing or failed test run via an API call) by retrieving or otherwise obtaining the test result log file of interest for analysis (task 302). For example, the developer may interact with the client application 107 to cause the client application 107 to make an API call to the LAD system 112 that includes identification of the test result log file 116 to be analyzed (e.g., by providing a unique identifier associated with the modified autobuild code for the mainline code branch version that allows the LAD system 112 to retrieve the appropriate test result log file 116 from the testing system 110). In other embodiments, the testing system 110 may automatically initiate or trigger the anomaly detection process 300 when a test run fails to execute to completion.

Similar to the vector space modeling process 200 of FIG. 2, the anomaly detection process 300 filters or otherwise removes nondescript information from the retrieved test result log file and converts the remaining information in the test result log file to numerical representation (tasks 304, 306). For example, as described above, the LAD system 112 goes through each log line of each reference log file to remove various words or other alphanumeric characters or markup within each log line that does not pertain to the performance or execution of the respective test case of the test run that corresponds to that log line (e.g., task 208). The LAD system 112 then hashes or otherwise converts each remaining distinct segment of alphanumeric characters within a respective log line into a corresponding numerical value using the same hash function, tokenization technique, or algorithm used to develop the vector space model (e.g., task 212).

After filtering and converting each log line into a numerical vector or matrix representation, the anomaly detection process 300 calculates or otherwise determines a difference metric for each respective log line with respect to the vector space model for the code version of interest, and detects or otherwise identifies an anomaly when the difference metric exceeds a detection threshold value (tasks 308, 310). In exemplary embodiments, the LAD system 112 converts each log line into a vector comprised of the respective numerical values of the log line in sequential order. The LAD system 112 then calculates or otherwise determines the difference between a respective log line and the non-anomalous vector space by calculating a dot product of the log line vector and the vector space matrix. In this regard, continuing the above example, for each log line of test log file 116 corresponding to the modified autobuild code for the mainline code branch version, the LAD system 112 calculates the dot product between that respective log line and the vector space matrix model 132 associated with the autobuild code for the mainline code branch version of the application platform 124 that was generated as described above in the context of FIG. 2. The resulting dot product value represents the deviation between the respective log line of the modified mainline autobuild code log file and the reference vector space for the mainline autobuild code. For example, the anomaly detection threshold may be set to a value of 0.3 to identify deviating log lines having a resultant dot product value greater than 0.3. That said, the anomaly detection threshold may vary depending on the needs of a particular application and to vary the number or frequency of potentially anomalous log lines identified, and the subject matter described herein is not limited to any particular anomaly detection threshold.

When the difference between a respective log line and the vector space matrix model is greater than the anomaly detection threshold, the anomaly detection process 300 stores or otherwise maintains the respective log line identified as anomalous, the difference metric, and potentially other data associated with the anomalous log line (task 312). For example, the LAD system 112 may store or otherwise maintain an identifier associated with the log line (e.g., the location of the log line within the log file 116), the original unmodified content of the log line, the dot product value associated with the respective log line, and potentially other data or information that may be relevant to debugging or analyzing the anomalous log line. For example, in some embodiments, one or more preceding or following log lines in the log file 116 may also be stored or maintained in association with the anomalous log line to facilitate temporal or sequential analysis of the log line with respect to adjacent log lines in the log file 116. The anomaly detection process 300 repeats the loop defined by tasks 306, 308, 310 and 312 until determining that all of the log lines in the log file have been analyzed and that processing of the log file is complete (task 314).

After processing of the log file is complete, the anomaly detection process 300 continues by creating or otherwise generating a log anomaly file that includes a listing of the anomalous log lines and their associated difference values and generating or otherwise providing graphical indicia of the anomalous log lines within the log file (tasks 316, 318). In this regard, the LAD system 112 may create an electronic file or other container that includes, for each anomalous log line, one or more of the identifier associated with the log line and/or the location of the log line within the log file 116, the dot product value associated with the respective log line, the original unmodified contents of the log line, and/or potentially other data or information that may be relevant to debugging or analyzing the anomalous log line (e.g., an identification of the test case 114 the log line pertains to).

The LAD system 112 may transmit or otherwise provide the log anomaly file to one or more of the application server 102, the testing system 110, and/or the client device 106 for depicting a graphical representation of the anomalous log lines at the client device 106. For example, a virtual application 126 at the application server 102 may generate a log anomaly analysis graphical user interface (GUI) display that includes a sequential listing of the anomalous log lines and their associated dot product values. It should be appreciated that the subject matter described herein is not intended to be limited to any particular GUI display or manner of presenting the anomalous log lines. In this regard, any number of dashboards, reports or visualizations may be generated based on the anomalous log lines and their corresponding test results, test case definitions and/or the like. The developer or other user at the client device 106 may then analyze the original unmodified content of the log line to debug the changes or modifications he or she made to the source code for the mainline code branch version of the application platform 124. In this regard, by virtue of the anomaly detection process 300, the user may quickly identify anomalous log lines and the corresponding test cases 114 to identify and remedy potential problems in changes made to source code without having to manually analyze the entire content of a log file 116. The anomaly detection process 300 may also facilitate identifying problems with underlying hardware issues or control plane software systems that are executing and managing tests and base systems.

Figure 4:
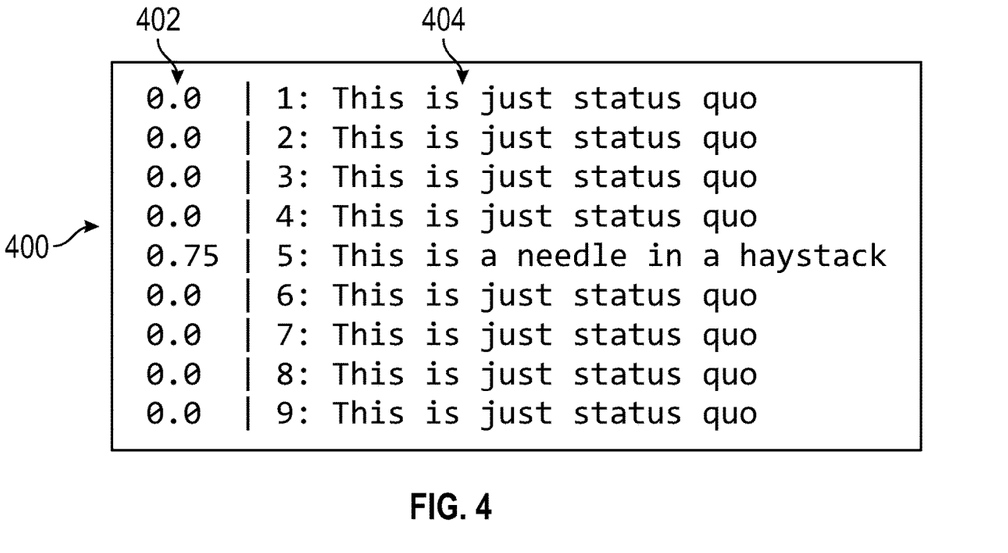
FIG. 4 depicts an exemplary log anomaly analysis graphical user interface (GUI) display suitable for presentation in connection with the anomaly detection process of FIG. 3 in one or more exemplary embodiments.

For example, FIG. 4 depicts an exemplary log anomaly analysis GUI display 400 that may be depicted by or within a client application 107 (e.g., on a web page associated with a virtual application). In this regard, it should be noted that although the subject may be described herein in the context of a log anomaly file, in some embodiments, the results of the anomaly detection process 300 may be streamed by the LAD system 112 to the client application 107, the application server 102, and/or some other system over the network 108 for presentation or storage by or at that respective destination device or system, in which case, the LAD system 112 need not package or encapsulate the results in a dedicated file at the LAD system 112. The log anomaly analysis GUI display 400 includes graphical representations of the dot product values 402 associated with respective log lines 404 of a test result log file with respect to a vector space model derived from a reference log file including six lines of "This is just status quo." A user viewing the log anomaly analysis GUI display 400 may readily identify the fifth log line as the anomalous log line within the test result log file based on its associated dot product value of 0.75 being greater than the remaining dot product values. In this regard, while the log anomaly analysis GUI display 400 depicts the entire 9 log lines of the test result log file, in practice, the log anomaly analysis GUI display 400 may be generated based on a log anomaly file that only includes anomalous log lines having an associated dot product value greater than an anomaly detection threshold (e.g., 0.3), such that only the fifth log line is depicted on the log anomaly analysis GUI display 400. In exemplary embodiments, the log anomaly analysis GUI display 400 includes the dot product value associated with an anomalous log line so that the user may readily ascertain the relative difference between the anomalous log line and the reference vector space as well as the contents of the anomalous log line, so that the user may view the contents of the log line and initiate debugging or further analysis of the log line.

Still referring to FIG. 3, in one or more embodiments, lines of the log file are analyzed concurrently, for example, by distributing or otherwise allocating individual log lines across multiple different computing devices 130 that perform the loop defined by tasks 306, 308, 310, 312 and 314 in parallel. Each of the computing devices 130 may be configured to store or otherwise maintain information or other indicia associated with detected anomalous log lines in a shared data storage element or memory, which may then be assembled into a log anomaly file. In this regard, the anomaly detection process 300 can be run concurrently, on N number of compute units in any order, and additionally, N number of test result log files can be compared to N number of vector space models concurrently. The parallel computing system can thus be scaled up or down in size as desired.

Figure 5:
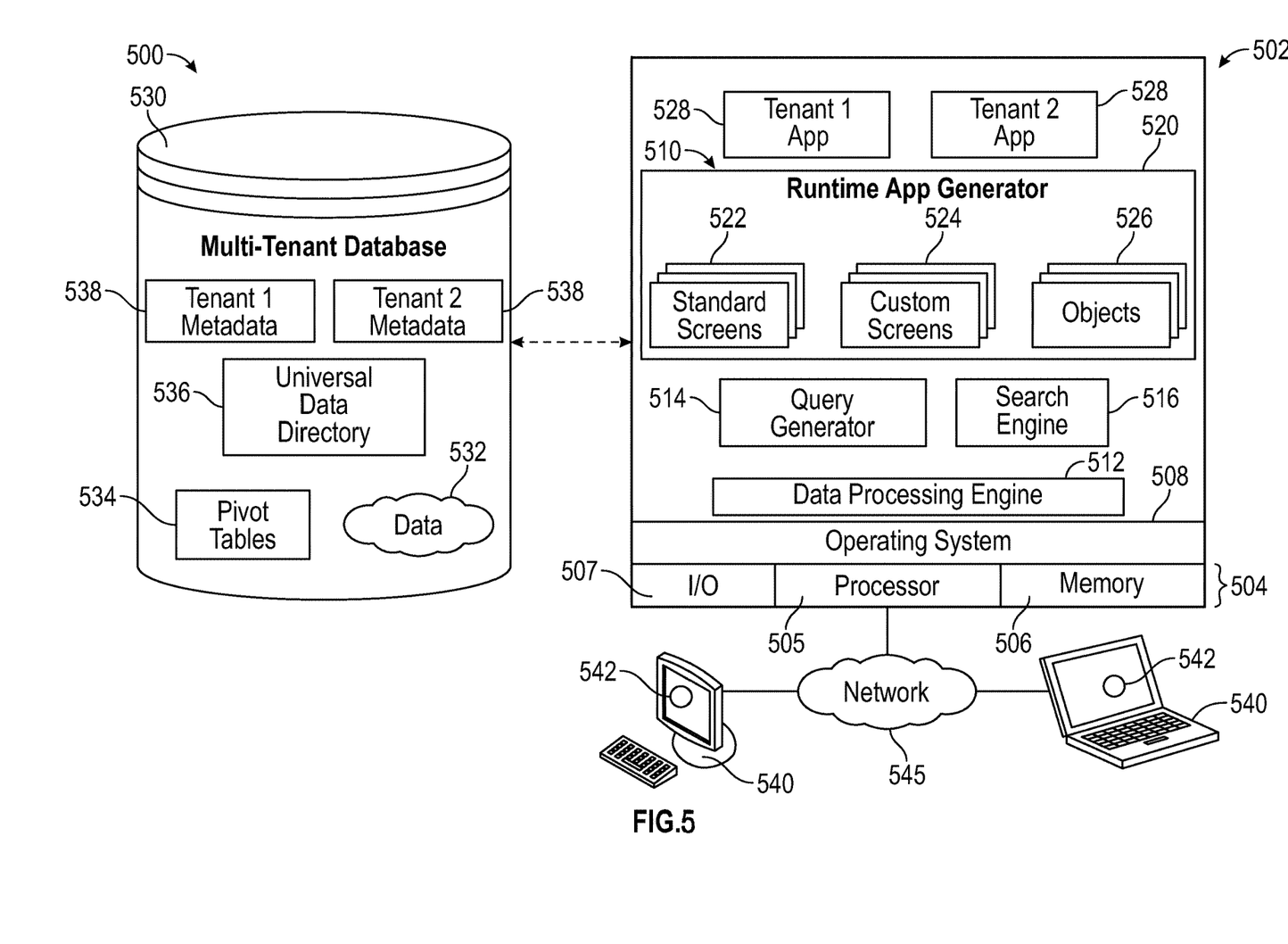
FIG. 5 is a block diagram of an exemplary multi-tenant system suitable for use with the computing system of FIG. 1 in accordance with one or more embodiments.

FIG. 5 depicts an exemplary embodiment of an on-demand multi-tenant database system 500 suitable for use with the computing system 100 of FIG. 1. The illustrated multi-tenant system 500 of FIG. 5 includes a server 502, such as server 102, that dynamically creates and supports virtual applications 528 (e.g., virtual application 126) based upon data 532 from a common database 530 (e.g., database 104) that is shared between multiple tenants, alternatively referred to herein as a multi-tenant database. Data and services generated by the virtual applications 528 are provided via a network 545 (e.g., network 108) to any number of client devices 540 (e.g., client device 106), as desired. Each virtual application 528 is suitably generated at run-time (or on-demand) using a common application platform 510 (e.g., application platform 124) that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500 (i.e., in the multi-tenant database 530). For example, the application server 502 may be associated with one or more tenants supported by the multi-tenant system 500. Although multiple tenants may share access to the server 502 and the database 530, the particular data and services provided from the server 502 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

Still referring to FIG. 5, the server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long-term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 526 such as "account" objects, "opportunity" objects, "contact" objects, or the like. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 (e.g., client application 107) executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, software development, testing, debugging, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of detecting anomalies with respect to an update to executable code for an application platform, the method comprising:
    obtaining log data associated with a plurality of tests executed with respect to a compiled version of the executable code for the application platform;
    filtering the log data based on one or more performance metrics associated with the plurality of tests to obtain reference log data;
    converting the reference log data to a corresponding numerical representation;
    generating a matrix of the numerical representation of the reference log data;
    obtaining test log data associated with one or more tests executed against an updated compilation of the executable code including the update; and
    for each line of the test log data:
        converting the respective line of the test log data into a respective numerical representation;
        determining a difference between the respective numerical representation and the matrix; and
        providing an indication of an anomaly associated with the respective line of the test log data when the difference is greater than a detection threshold.

2. The method of claim 1, wherein obtaining the test log data comprises obtaining a test results log file associated with the updated compilation of the executable code from a testing system.

3. The method of claim 2, wherein:
    converting the respective line of the test log data into the respective numerical representation comprises converting a log line of the test results log file into a numerical vector representation; and
    determining the difference comprises calculating a value of a dot product between the numerical vector representation and the matrix.

4. The method of claim 3, wherein providing the indication comprises providing a graphical representation of the log line and the value of the dot product when the value of the dot product is greater than the detection threshold.

5. The method of claim 4, wherein:
    obtaining the log data comprises obtaining a plurality of test result log files associated with the plurality of tests previously executed with respect to compiled versions of the executable code for the application platform prior to the update;

filtering the log data comprises identifying a reference subset of the plurality of test result log files having respective values for the one or more performance metrics satisfying one or more selection thresholds; and
the reference log data comprises the reference subset of test result log files.

6. The method of claim 5, further comprising filtering nondescript information from the reference subset of test result log files to obtain filtered reference test result log files, wherein:
converting the reference log data to the corresponding numerical representation comprises converting remaining content of each respective log line of each respective one of the filtered reference test result log files to a corresponding sequence of numerical values associated with the respective log line of the respective filtered reference test result log file.

7. The method of claim 6, wherein:
generating the matrix comprises constructing a multidimensional matrix configured to maintain the corresponding sequence of numerical values in association with the respective log line of the respective filtered reference test result log file; and
calculating the value comprises calculating the value of the dot product between the numerical vector representation and the multidimensional matrix.

8. The method of claim 1, wherein:
obtaining the log data comprises obtaining a plurality of test result log files associated with the plurality of tests previously executed with respect to compiled versions of the executable code for the application platform prior to the update;
filtering the log data comprises identifying a reference subset of the plurality of test result log files having respective values for the one or more performance metrics satisfying one or more selection thresholds; and
the reference log data comprises the reference subset of test result log files.

9. The method of claim 8, further comprising filtering nondescript information from the reference subset of test result log files to obtain filtered reference test result log files, wherein:
converting the reference log data to the corresponding numerical representation comprises converting remaining content of each respective log line of each respective one of the filtered reference test result log files to a corresponding sequence of numerical values associated with the respective log line of the respective filtered reference test result log file.

10. The method of claim 9, wherein generating the matrix comprises constructing a multidimensional matrix configured to maintain the corresponding sequence of numerical values in association with the respective log line of the respective filtered reference test result log file.

11. The method of claim 1, wherein:
determining the difference comprises determining a value of a dot product of the respective numerical representation and the matrix; and
providing the indication comprises providing the indication when the value of the dot product is greater than the detection threshold.

12. The method of claim 1, wherein the application platform is capable of providing instances of a virtual application generated using data maintained in a database.

13. The method of claim 1, further comprising generating a file comprising an anomalous subset of lines of the test log data, wherein the difference associated with each respective line of the anomalous subset is greater than the detection threshold.

14. A non-transitory computer-readable medium having instructions stored thereon that, when executed by a processing system, cause the processing system to:
obtain log data associated with a plurality of tests executed with respect to a compiled version of executable code for an application platform;
filter the log data based on one or more performance metrics associated with the plurality of tests to obtain reference log data;
convert the reference log data to a corresponding numerical representation;
generate a matrix of the numerical representation of the reference log data;
obtain test log data associated with one or more tests executed against an updated compilation of the executable code including an update to the executable code; and
for each line of the test log data:
convert the respective line of the test log data into a respective numerical representation;
determine a difference between the respective numerical representation and the matrix; and
provide an indication of an anomaly associated with the respective line of the test log data when the difference is greater than a detection threshold.

15. The non-transitory computer-readable medium of claim 14, wherein the instructions cause the processing system to obtain the test log data by obtaining a test results log file associated with the updated compilation of the executable code from a testing system.

16. The non-transitory computer-readable medium of claim 15, wherein the instructions cause the processing system to:
convert the respective line of the test log data into the respective numerical representation by converting a log line of the test results log file into a numerical vector representation; and
determine the difference by calculating a value of a dot product between the numerical vector representation and the matrix.

17. The non-transitory computer-readable medium of claim 14, wherein:
the log data comprises a plurality of test result log files associated with the plurality of tests previously executed with respect to compiled versions of the executable code for the application platform prior to the update; and
the reference log data comprises a reference subset of the plurality of test result log files having respective values for the one or more performance metrics satisfying one or more selection thresholds.

18. The non-transitory computer-readable medium of claim 14, wherein the instructions cause the processing system to:
determine the difference by determining a value of a dot product of the respective numerical representation and the matrix; and
provide the indication by providing the indication when the value of the dot product is greater than the detection threshold.

19. The non-transitory computer-readable medium of claim 14, wherein the instructions cause the processing system to generate a file comprising an anomalous subset of lines of the test log data, wherein the difference associated with each respective line of the anomalous subset is greater than the detection threshold.

20. A system comprising:
  a data storage element; and
  one or more computing devices coupled to the data storage element and a network to:
    obtain log data associated with a plurality of tests executed with respect to a compiled version of executable code for an application platform via the network;
    filter the log data based on one or more performance metrics associated with the plurality of tests to obtain reference log data;
    convert the reference log data to a corresponding numerical representation;
    generate a matrix of the numerical representation of the reference log data;
    obtain test log data associated with one or more tests executed against an updated compilation of the executable code including an update to the executable code; and
    for each line of the test log data:
      convert the respective line of the test log data into a respective numerical representation;
      determine a difference between the respective numerical representation and the matrix; and
      provide an indication of an anomaly associated with the respective line of the test log data when the difference is greater than a detection threshold.

* * * * *